US006958820B1

(12) United States Patent
Takenaka et al.

(10) Patent No.: US 6,958,820 B1
(45) Date of Patent: Oct. 25, 2005

(54) IMAGE PROCESSING APPARATUS AND METHOD THEREFOR

(75) Inventors: Shumpei Takenaka, Yamato (JP); Yukinobu Suwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 09/685,737

(22) Filed: Oct. 11, 2000

(30) Foreign Application Priority Data

Oct. 12, 1999 (JP) ................................ 11-289375

(51) Int. Cl.[7] ......................... G06F 15/00; H04N 1/387

(52) U.S. Cl. ..................... 358/1.12; 358/1.2; 358/1.13; 358/1.18; 358/1.9; 358/450; 358/451

(58) Field of Search ............................. 358/1.12, 1.16, 358/1.18, 1.2, 1.9, 450, 451, 1.13

(56) References Cited

U.S. PATENT DOCUMENTS

| | | | | |
|---|---|---|---|---|
| 5,878,197 | A * | 3/1999 | Miyahara | 358/1.16 |
| 6,163,656 | A * | 12/2000 | Yoshioka | 396/429 |
| 6,188,490 | B1 * | 2/2001 | Miyake | 358/1.18 |
| 6,243,682 | B1 * | 6/2001 | Eghtesadi et al. | 704/270 |
| 6,266,455 | B1 * | 7/2001 | Kobayashi | 382/307 |
| 6,305,281 | B1 * | 10/2001 | Aizawa | 101/118 |
| 6,385,348 | B1 * | 5/2002 | Harada | 382/284 |
| 6,526,182 | B2 * | 2/2003 | Morita | 382/284 |
| 6,559,971 | B1 * | 5/2003 | Watts et al. | 358/1.2 |
| 6,618,553 | B1 * | 9/2003 | Shiohara | 386/117 |

FOREIGN PATENT DOCUMENTS

| | | |
|---|---|---|
| EP | 0 920 186 A2 | 9/1994 |
| EP | 0 784 294 A2 | 7/1997 |
| WO | WO 97/60243 A | 12/1997 |

OTHER PUBLICATIONS

Cannon ImageRUNNER 400/330 series, 1998, pp 1-4, 1-5, 2-22, 2-23, 3-20, 3-21, 3-22 & 3-23.*

Patent Abstracts of Japan, vol. 1998, No. 8 (Jun. 30, 1998) (Kokai 10-065947 A of Mar. 6, 1998).

Patent Abstracts of Japan, vol. 1996, No. 9 (Sep. 30, 1996) (Kokai 08-39909 A of May 31, 1996).

* cited by examiner

*Primary Examiner*—Edward Coles
*Assistant Examiner*—Chan S. Park
(74) *Attorney, Agent, or Firm*—Fitzpatrick, Cella, Harper & Scinto

(57) ABSTRACT

In printing plural desired images on a printing sheet, instead of printing the images at a size according to the sheet size (so that the magnification of the images varies according to the sheet size and it is not possible to printing the desired image with the desired size on the sheet), an apparatus has an arrangement for designating the size of an image to be printed on a sheet, arranging the images on a sheet.

3 Claims, 9 Drawing Sheets

IMAGE PROCESSING APPARATUS AND METHOD THEREFOR

BACKGROUND OF THE INVENTION

1. Field of the Invention

The present invention relates to an image processing apparatus for efficiently arranging and printing, on a designated sheet, all the image data or selected portions thereof, obtained by a device such as a digital camera or the like and stored in a memory medium, and an image processing method and a memory medium adapted for use therefor.

2. Related Background Art

In a case of printing plural images on a printing sheet by designating division therein in a conventional printing apparatus, the number of printed images, the printing positions and the printing areas are defined as invariable values, so that the sheet and the images to be printed are designated in units of sheets.

Also in such conventional printing apparatus, in a case of printing plural desired images on a printing sheet, the images are printed at a size according to the sheet size, so that the magnification of the images varies according to the sheet size, and it is not possible to print the desired image with the desired size on the sheet unless the desired size happens to coincide with that dictated by the sheet size.

SUMMARY OF THE INVENTION

According to the present invention, the foregoing objects are achieved by means of a print control apparatus for printing a plurality of images, and comprising print size designation means for designating a print size for each of the plurality of images to be printed, and sheet size designation means for designating a sheet size on which an image to be printed is printed. Print image number designation means designate a number of images to be printed on a page, and control means control execution of a print by reducing each of the print sizes designated by the print size designation means, in a case where no image can be printed on a page for the sheet designated by the sheet size designation means while maintaining the print size designated by the print designation means. In addition, in a case where the number of images that can be printed on the sheet is less than the number of images designated by the print image number designation means and at least one or more of the images can be printed on a separate page, the control means control an execution of printing by reducing a number of images that are allowed in one page with the print size designated by the print size designation means.

In another aspect, the invention is a print control method of printing a plurality of images, comprising the steps of designating a print size for each of the plurality of images to be printed, designating a sheet size on which an image to be printed is printed, designating a number of images to be printed on a page, and controlling execution of a print by reducing each of the print sizes designated in the step of designating a print size, in a case where no image can be printed on a page for the sheet designated in the step of designating a sheet size while maintaining the print size designated in the step of designating a print size. In addition, in a case where the number of images that can be printed on the sheet is less than the number of images designated in the step of designating a number of images and at least one or more of the images can be printed on a separate page, an execution of printing is controlled by reducing a number of images that are allowed in one page with the print size designated in the step of designating a print size in the step of controlling execution of a print.

In still another aspect, the present invention is a computer-readable medium storing a program executing the steps of designating a print size for each of the plurality of images to be printed, designating a sheet size on which an image to be printed is printed, designating a number of images to be printed on a page, and controlling execution of a print by reducing each of the print sizes designated in the step of designating a print size, in a case where no image can be printed on a page for the sheet designated in the step of designating a sheet size while maintaining the print size designated in the step of designating a print size. In addition, in a case where the number of images that can be printed on the sheet is less than the number of images designated in the step of designating a number of images and at least one or more of the images can be printed on a separate page, an execution of printing is controlled by reducing a number of images that are allowed in one page with the print size designated in the step of designating a print size in the step of controlling execution of a print.

DETAILED DESCRIPTION OF THE PREFERRED EMBODIMENTS

Now the present invention will be explained by reference to the preferred embodiments thereof, with reference to the accompanying drawings.

Figure 1:
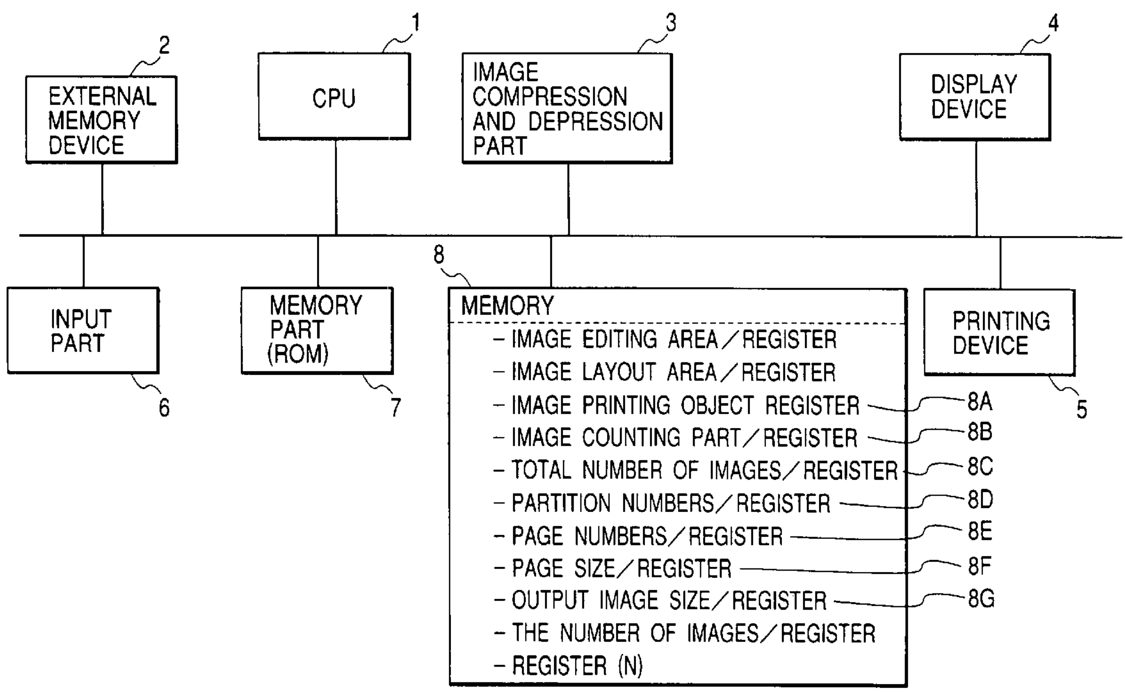
FIG. 1 is a block diagram of a control apparatus for an electronic image.

FIG. 1 is a block diagram of a control apparatus for an electronic image. As an external memory device 2, a non-volatile memory medium can be chosen as an example. An external memory device 2 is detachably mountable on a digital camera and also on the present control apparatus, and stores the image data taken for example by the digital camera as an image file. The above-mentioned non-volatile memory medium may also contain a print object designation/condition file for defining the print object image and the print condition such as the printing sheet. Also, instead of employing the detachable memory medium, the control apparatus in the present invention may incorporate a memory device for storing a file transferred directly from the digital camera or through a memory medium.

The image designation for arranging images on a sheet is executed from an input part 6. Such image designation includes the setting of various conditions for example of designation of a sheet size such as B4, A4, B5 or A5, that of a print sheet size such as a whole sheet, a half sheet, a quarter sheet or a sixth sheet of the newspaper size, number of image divisions per printing sheet or image size (represented by sheet size or by image dimension), and the designation of an appropriate layout mode. When the image signal is selected and designated, the number thereof is from time to time stored in an image printing object register area 8A in a memory 8, and the number of an image counter area 8B in the memory 8 is at the same time increased by one and is newly stored in a total image number register 8C therein. Then, as a condition for arranging and printing plural images on a page, a partition number for designating the number of divisions or the number of images to be arranged on a page is entered manually from the input part 6 and is stored in a partition number register 8D of the memory 8. Similarly the desired number of sheets is stored in a page number register 8E in the memory 8, and the desired print sheet size is stored in a page size register 8F. Also, the desired image size is stored in an output image size register 8G.

A partition number register 8D in the memory 8 stores a number of additional images and a condition of layout permissible in a case of maintaining the printed image size, determined from the sheet and the partition number, and the minimum distance of the images, by referring to a partition table based on the maximum partition layout condition and the partition number at the completion of sheet setting. A decode/distribution process distributes and stores, in a case in which an external memory device 2 (for example, a non-volatile memory medium storing image data) contains an image to be printed and a condition designating file corresponding to the image, the results of decoding of such content in the total image number register 8C, the image printing object register 8A, the partition number register 8D, the page number register 8E, the page size register 8F and the output image size register 8G. An image decode/decompression process executes decoding of the compressing condition of data compressed for example by JPEG and decompression of the data. Pixel information 18 obtained by the image decode/decompression part 3 is supplied to a central processing unit (CPU) 1, and the layout condition is determined from the print output size and the output resolution, by referring to the areas in the memory 8, namely the total image number register 8C, the image printing object register 8A, the partition number register 8D, the page number register 8E, the sheet size register 8F and the output image size register 8G. A printing device 5 converts the image data, decompressed according to the result of the CPU 1, into print data matching the printing apparatus and transfers such print data thereto. For calculating the layout condition, the CPU 1 acquires and stores in advance various conditions relating to the print layout such as the printable area, through a print control part. Programs corresponding to the flow charts shown in FIGS. 2 to 8 are stored in a read-only memory (ROM) of a memory 7 shown in FIG. 1, and are executed by the CPU. The programs stored in the ROM may be stored in another memory medium or may be loaded from an external memory into an internal memory.

In this embodiment of the present invention, in a printing apparatus provided with means for entering image number information, etc., for specifying the image data stored in the non-volatile memory medium, a control part for decoding and decompressing the image data, a control part for printing the image data and decoding means for the non-volatile memory medium storing the print object and condition designating file prepared in advance by image designating means outside the present apparatus, for example, that of a digital camera, the print object image information obtained by an input of the print object image number or by decoding the print object and condition designating file is stored in a specified memory part of the apparatus, and the images designated by thus stored information are arranged in succession on the printing sheet according to the image layout condition of the designated sheet, whereby the printing with automatic page change is continued until all the images are printed.

Figure 5:
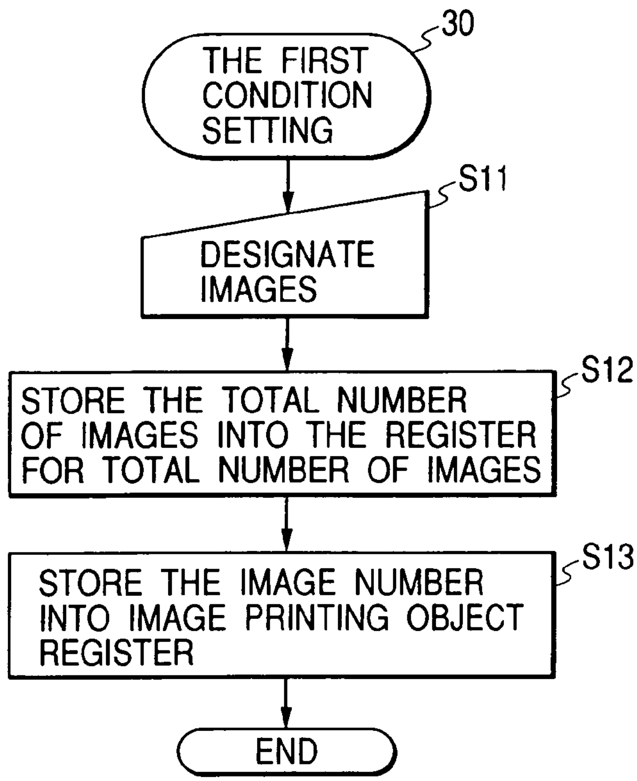
FIG. 5 is a flow chart for a condition setting 1.

At first reference is made to FIG. 5 for explaining a first condition setting process for designating an image.

At first, in a step S11, an image to be designated is entered manually from the input part 6. Then a step S12 stores the total number of the designated images in the total image number register 8C. Then, a step S13 stores the image number of the image designated by the input part 6 in the image printing object register 8C.

Figure 6:
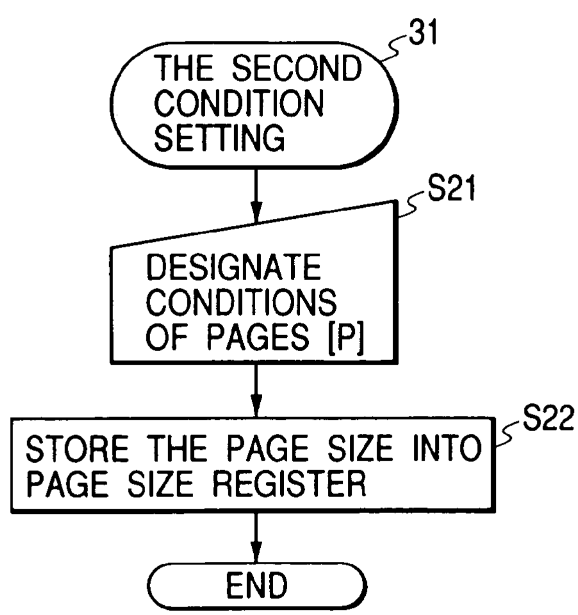
FIG. 6 is a flow chart for a condition setting 2.

Now reference is made to FIG. 6 for explaining a second condition setting process for designating the sheet size.

At first, in a step S21, an input on the sheet to be designated is entered from the input part 6. Then a step S22 stores the sheet size entered from the input part 6 in the sheet size register 8F.

Figure 7:
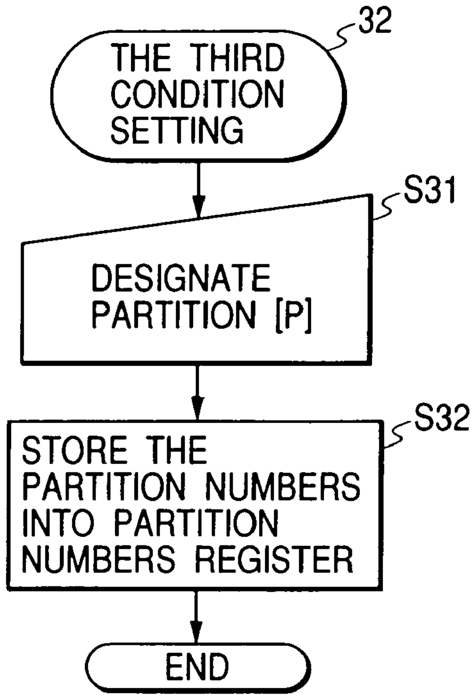
FIG. 7 is a flow chart for a condition setting 3.

Now reference is made to FIG. 7 for explaining a third condition setting process for designating the partition number.

At first, in a step S31, a partition number is manually entered from the input part 6. Then a step S32 stores the partition number, entered from the input part 6, in the partition number register 8D.

Figure 8:
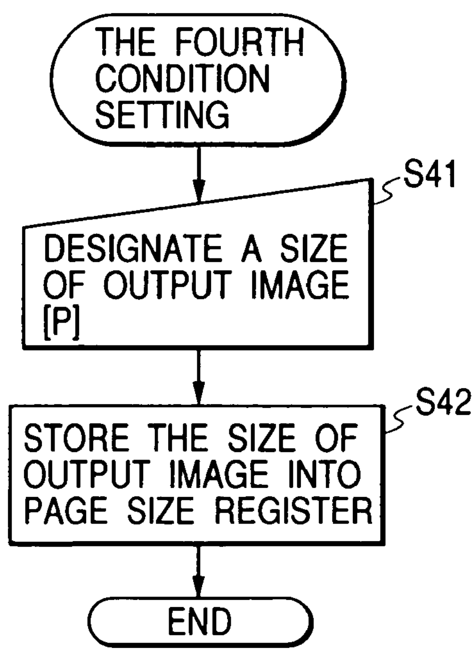
FIG. 8 is a flow chart for a condition setting 4.

Now reference is made to FIG. 8 for explaining a fourth condition setting process for designating an image size.

At first, in a step S41, an image size is entered from the input part 6. Then a step S42 stores the image size entered from the input part 6 in the image size register 8G.

Figure 2:
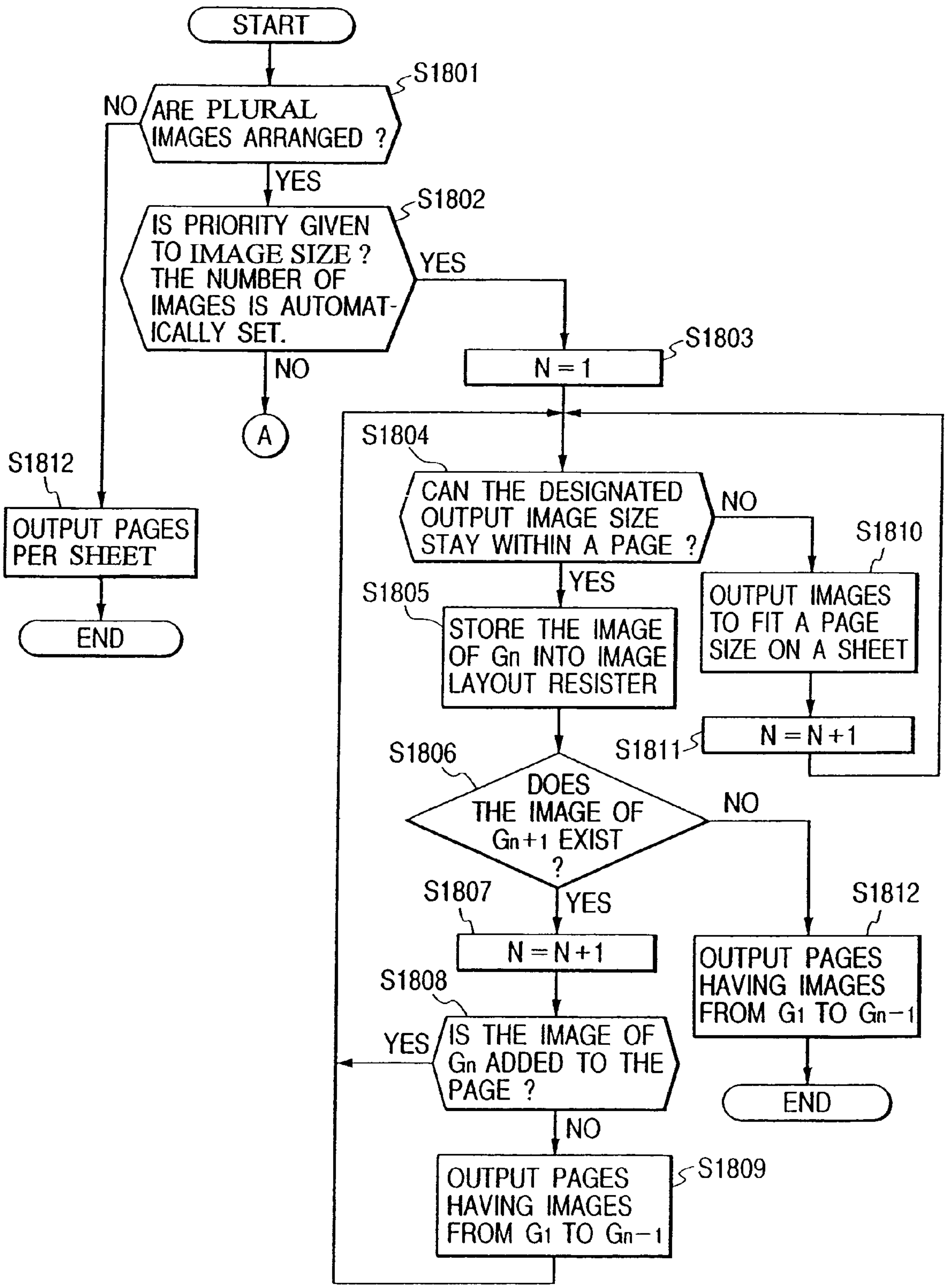
FIG. 2 is a flow chart showing an example of printing control.

In the following there will be explained, with reference to FIG. 2, a process in a case in which the printing is instructed by the user after the aforementioned first to fourth condition settings. Each condition setting is achieved either automatically or by entering a numerical condition. The automatically set condition becomes lower in priority in case another condition is entered by the numerical value.

In the following there will be explained a case where the image is to be outputted with a desired size on the sheet or the number of images to be outputted on the sheet is designated while the image size is automatically set.

Figure 11A:
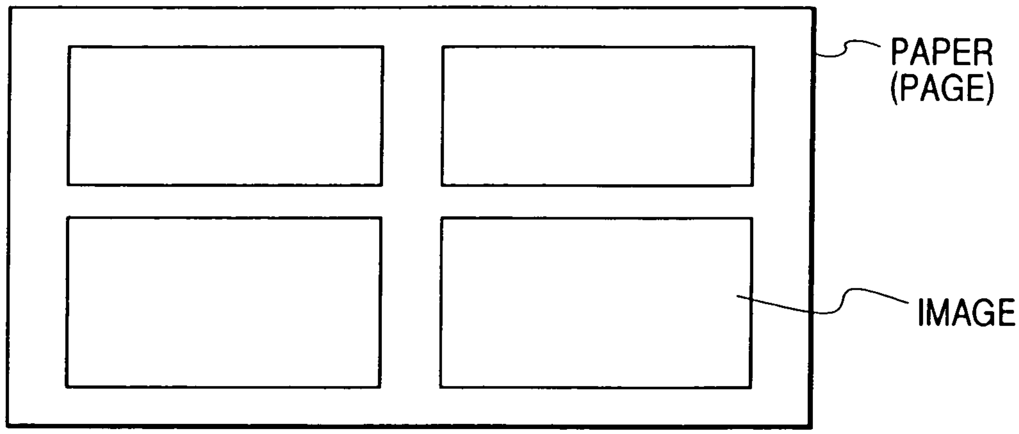
FIGS. 11A, 11B and 11C are views showing example of images printed on a sheet.
Figure 11B:
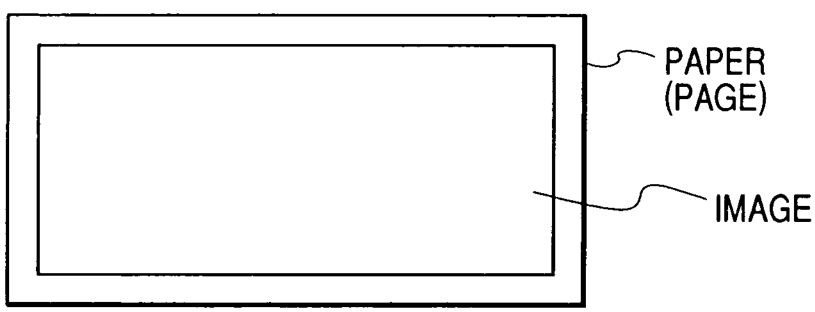
Figure 11C:
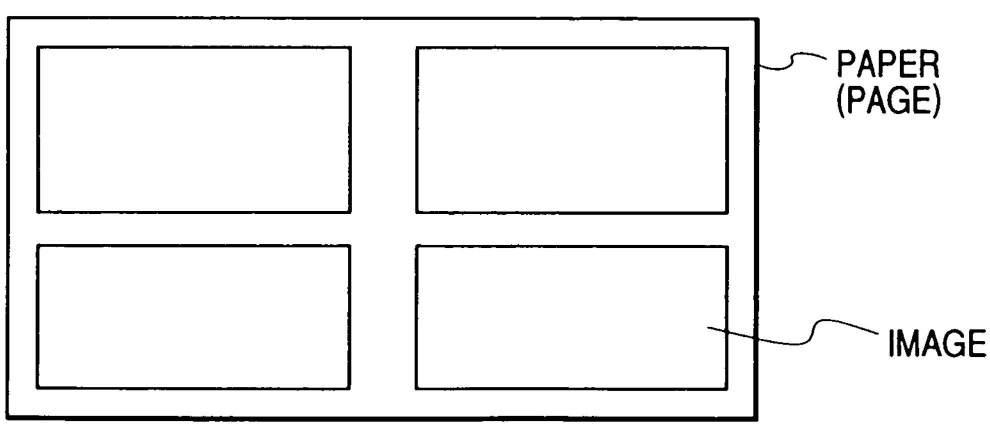

At first, in step S1801, it is checked whether plural images on the output sheet are arranged or not. If "NO" in step S1801, an image read from the file is output to an image layout register for outputting an image with the designated image size on the sheet in step S1812 as shown in FIG. 11B. On the other hand, if "YES" in step S1801, the sequence proceeds to step S1802 for discriminating whether the priority is given to the image size and the number of images is automatically set. If the priority is given to the image size, the sequence proceeds to step S1803 for setting "1" in a register N. Then step S1804 checks whether the images of a number of the register N can be accommodated in the sheet. If affirmative, step S1805 transfers an image Gn from the file into the image layout register, and next step S1806 checks whether a next image Gn+1 is present. If not, step S1811 sends an image layout storing the images up to the image Gn+1 to the printing apparatus and executes output on the output sheet as shown in FIG. 11A. If affirmative, a process for adding N+1 into N (N=N+1) is executed in step S1807, and it is checked whether the image Gn is added to the image layout on the sheet in step S1808. That is, there is checked, from the sheet size and the image size, whether the plural images can be laid on the sheet. If the result is negative, the images up to Gn+1 stored in the image layout register is output to the printing sheet in step S1809. If the result in the step S1804 is negative, step S1810 executes output to the image layout register by reducing the output size on the sheet, and then to the printing apparatus for printing as shown in FIG. 11C. Then there is executed a process N=N+1 on the register N, and the sequence returns to step S1804.

Figure 3:
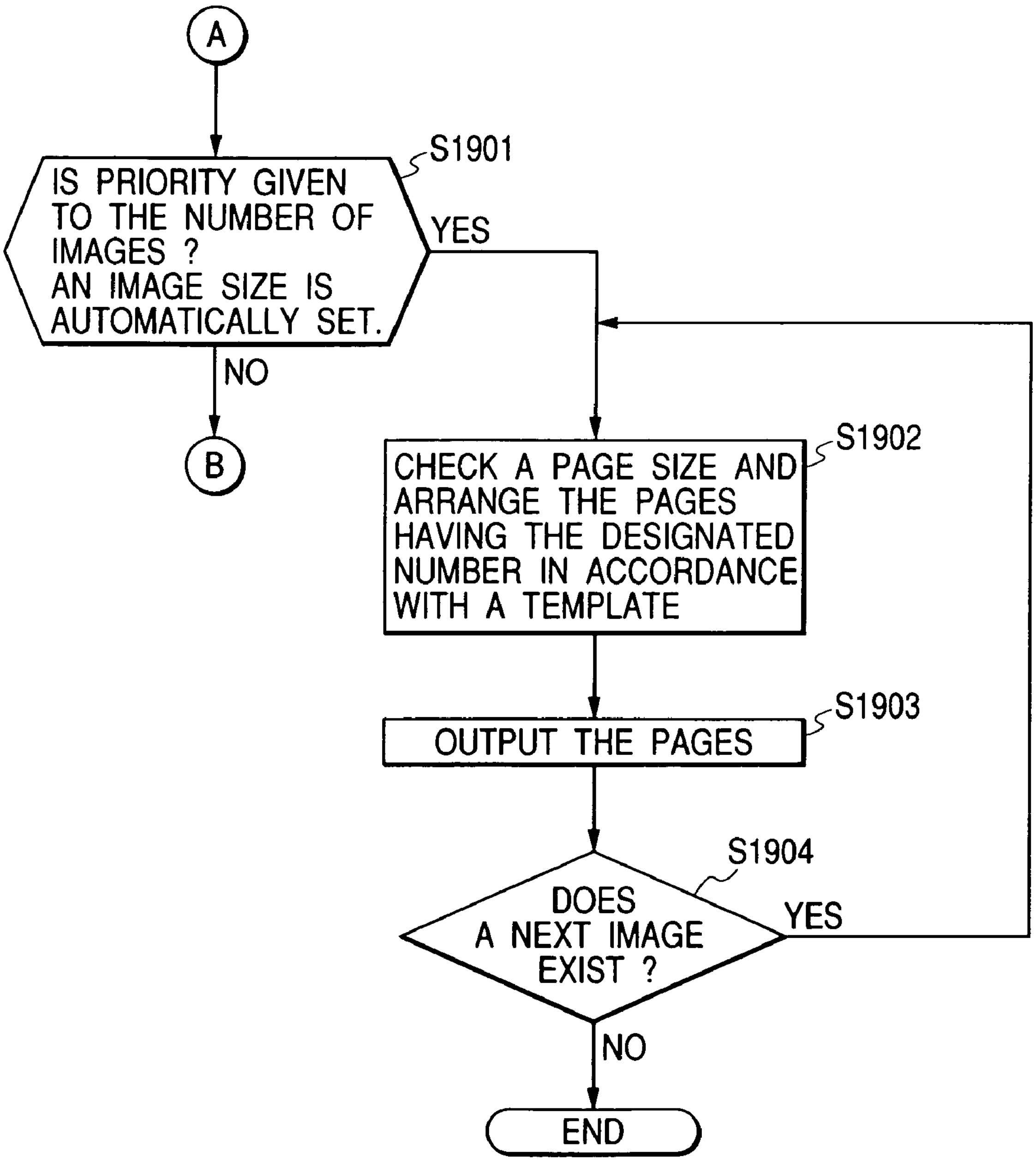
FIG. 3 is a flow chart showing an example of printing control with priority on the number of images.

In a case in which step S1802 identifies that the priority is given to the image size and the number of images is not automatically set, the sequence proceeds to the flow chart shown in FIG. 3, wherein step S1901 discriminates whether the priority is given to the number of images and the image size is automatically set.

If affirmative, step S1902 checks the sheet size, and stores the designated number of images in the image layout register of the memory 8 according to a template, and then the images are printed on the output sheet (S1903). Then there is searched, in the memory medium of the external memory device, whether a next image is present (S1904). If present, the sequence returns to step S1902, but, if not, the sequence is terminated.

Figure 4:
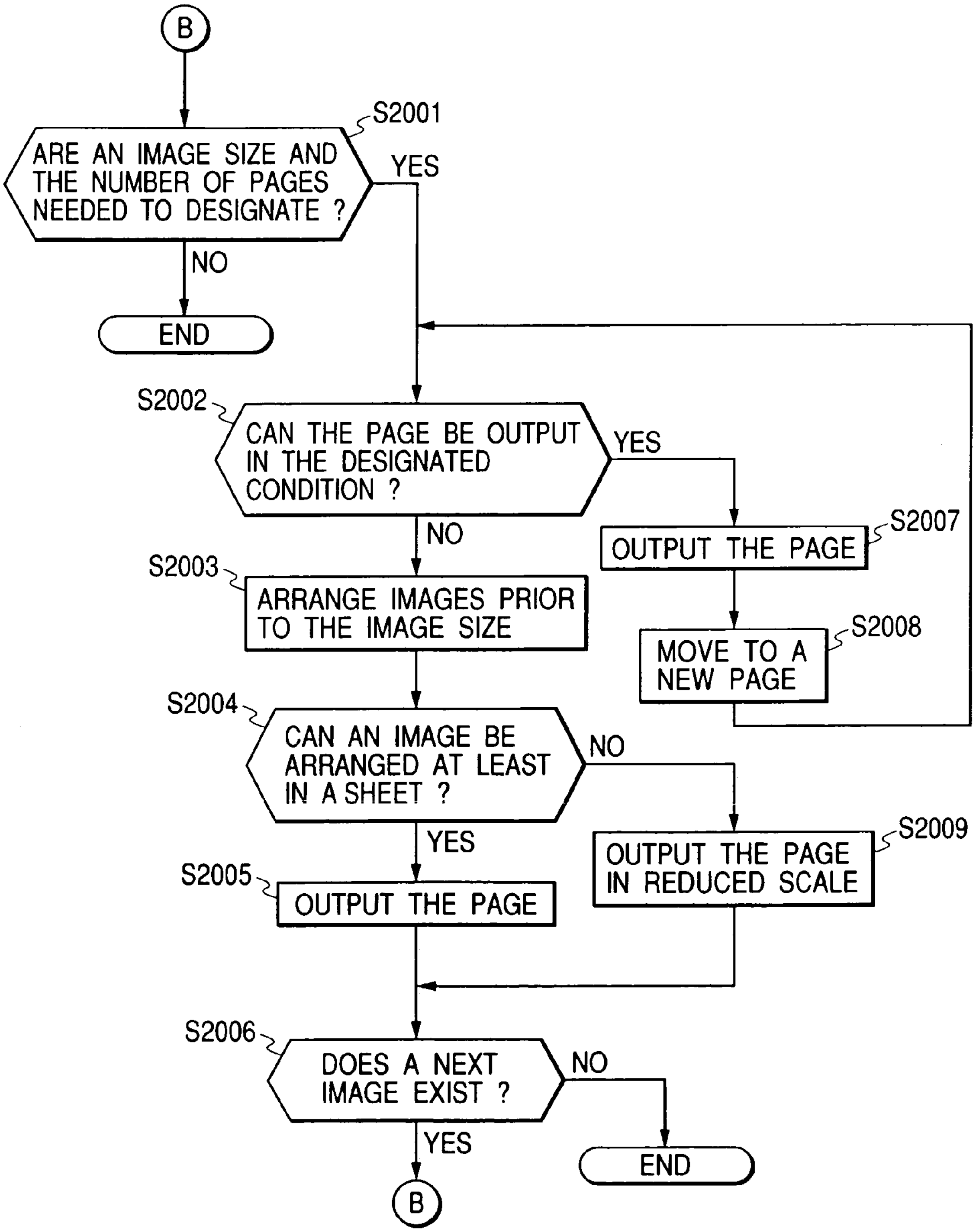
FIG. 4 is a flow chart showing printing control in a case in which the image size and the number of images are both designated.

If the result of step S1901 is negative, the sequence proceeds to the flow chart shown in FIG. 4.

In step S2001, it is checked whether the image size and the number of images are both designated. If the both designations are absent, the sequence is terminated, but, if they are present, the sequence proceeds to step S2002 for discriminating whether the designated output is possible on the sheet. If the designated output is possible, there are executed the output of a sheet (step S2007) and a page change process for proceeding to a next sheet (step S1008). On the other hand, if the designated output is not possible, an image is arranged with priority on the image size in step S2003. Then step S2004 discriminates whether at least an image can be placed. If possible, there is executed output (step S2005), but, if not, there is executed output with a reduction in the size (step S2009). Then step S2006 checks whether a next image is present. If absent, the sequence is terminated, but, if present, the sequence returns to step S2001 for repeating the above-described procedure.

Figure 9A:
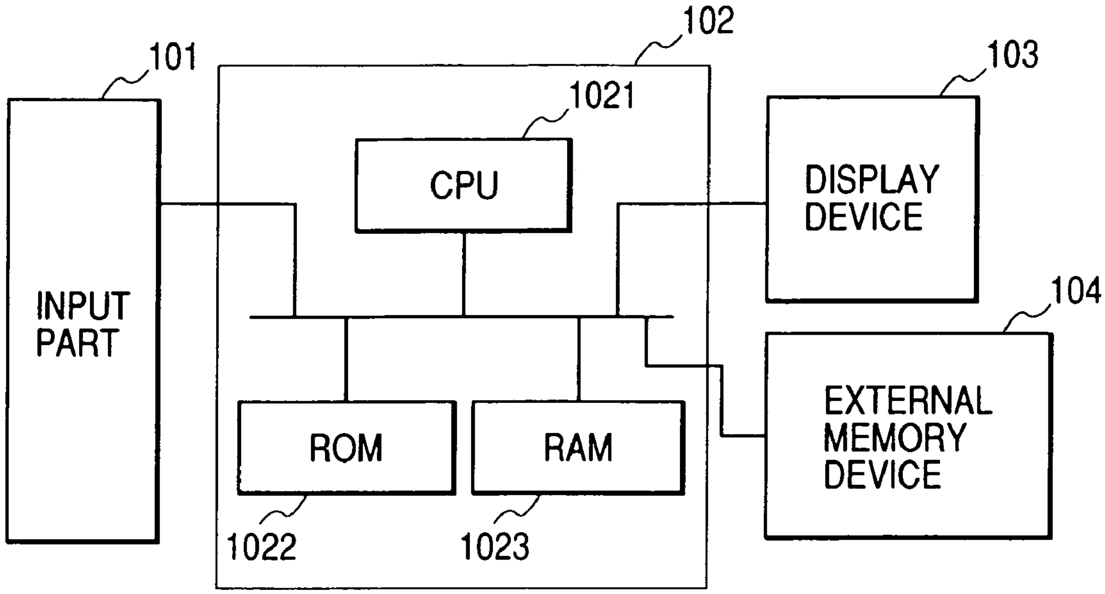
FIGS. 9A and 9B are respectively a block diagram and an external view of a digital camera.
Figure 9B:
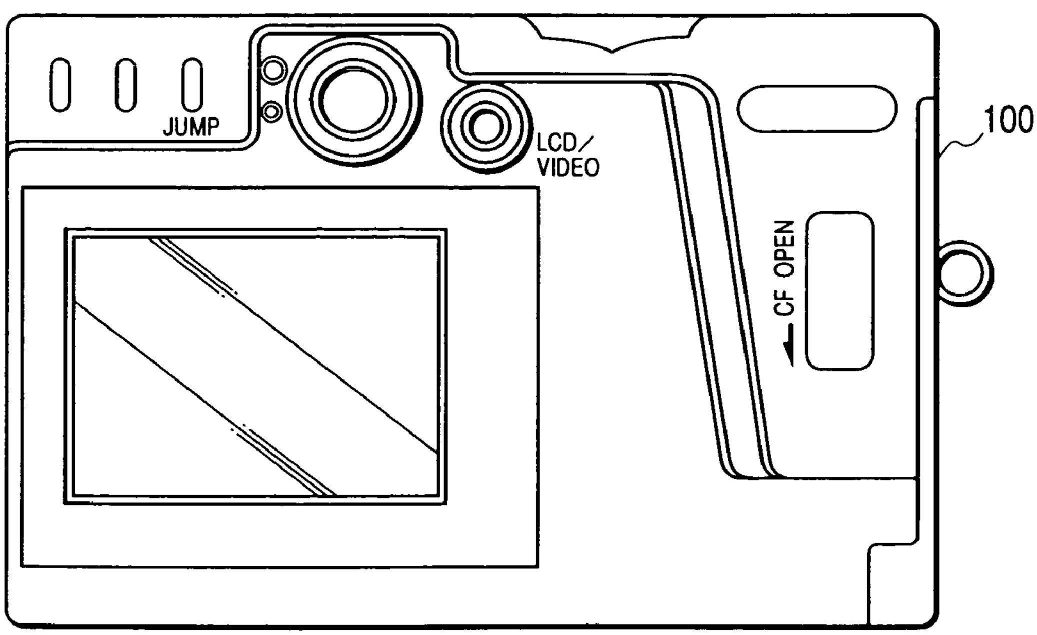

FIG. 9A is a block diagram of a digital camera 100 shown in FIG. 9B, wherein an input part 101 is used for designating the setting of mode etc. A processing part 102 includes a CPU 1021, a ROM 1022, and a RAM 1023. The ROM 1022 stores the procedure shown in FIG. 10. The RAM 1023 stores an image fetched by the input means in correlation with the image size designated by the designation means for designating the image size. The RAM 1023 corresponds to the memory 8 shown in FIG. 1. An image is taken from an input part 101 or an image pickup part, and the image and the attribute information defined therefor are stored through an external memory device 104. Such external memory device 104 corresponds to the external memory device 2 shown in FIG. 1.

Figure 10:
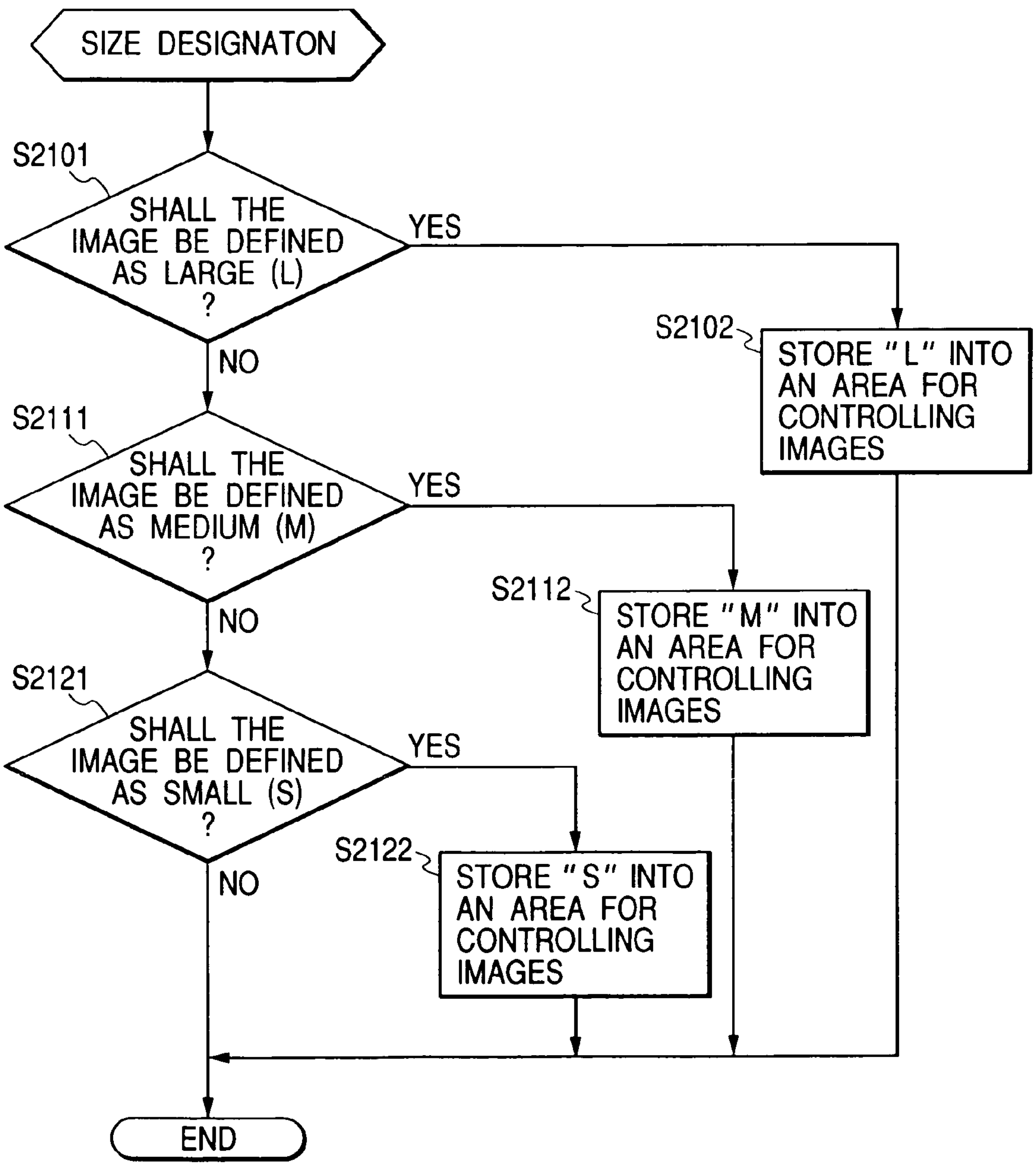
FIG. 10 is a flow chart for condition setting with the digital camera.

At first the taken image is displayed on a display device 103. Then, according to a program of the ROM 7, there are entered, from the input part 101, the size of the image to be outputted and the instruction for example for executing or not the printing. FIG. 10 shows the process flow to be executed by the CPU for defining the image size (large (L), medium (M) or small (S)) for the image. The display device 103 displays the image, and, in such display state, the image size for such image is entered from the input part (steps S2101, S2111, S2121). The image and the image size data are stored in an external memory device 104 (steps S2101, S2112, S2122).

In the foregoing embodiment, the image control apparatus for executing the image control can be a digital camera, a computer or an image printing order receiving and processing device (i.e., a printer).

Also, image processing software may be utilized within each device.

The present invention allows one to obtain the print result desired by the user with the designation of the image size, in contrast to the conventional method in which the image designation and the printing operation have to be repeated in the unit of each page. Consequently, it is rendered possible to execute the printing without size designation at the printing operation, and, as the output size can also be designated on the displayed image instead of on the printing, the image can be reproduced with the desired size on the display, so that the image can be rendered visible in the desired size, in a simpler manner than in the conventional technology.

What is claimed is:

1. A print control apparatus for printing a plurality of images, comprising:

print size designation means for designating a print size for each of the plurality of images to be printed;

sheet size designation means for designating a sheet size on which an image to be printed is printed;

print image number designation means for designating a number of images to be printed on a page; and control means for controlling execution of a print by reducing each of the print sizes designated by said print size designation means, in a case where no image can be printed on a page for the sheet designated by said sheet size designation means while maintaining the print size designated by said print size designation means, wherein, in a case where the number of images that can be printed on the sheet is less than the number of images designated by said print image number designation means and at least one or more of the images can be printed on a separate page, said control means controls an execution of printing by reducing a number of images that are allowed in one page with the print size designated by said print size designation means.

2. A print control method of printing a plurality of images, comprising the steps of:

designating a print size for each of the plurality of images to be printed;

designating a sheet size on which an image to be printed is printed;

designating a number of images to be printed on a page; and controlling execution of a print by reducing each of the print sizes designated in said step of designating a print size, in a case where no image can be printed on a page for the sheet designated in said step of designating a sheet size while maintaining the print size designated in said step of designating a print size, wherein, in a case where the number of images that can be printed on the sheet is less than the number of images designated in said step of designating a number of images and at least one or more of the images can be printed on a separate page, an execution of printing is controlled by reducing a number of images that are allowed in one page with the print size designated in said step of designating a print size in said step of controlling execution of a print.

3. A computer-readable medium storing a program executing the steps of:

designating a print size for each of the plurality of images to be printed;

designating a sheet size on which an image to be printed is printed;

designating a number of images to be printed on a page; and controlling execution of a print by reducing each of the print sizes designated in said step of designating a print size, in a case where no image can be printed on a page for the sheet designated in said step of designating a sheet size while maintaining the print size designated in said step of designating a print size, wherein, in a case where the number of images that can be printed on the sheet is less than the number of images designated in said step of designating a number of images and at least one or more of the images can be printed on a separate page, an execution of printing is controlled by reducing a number of images that are allowed in one page with the print size designated in said step of designating a print size in said step of controlling execution of a print.

* * * * *

UNITED STATES PATENT AND TRADEMARK OFFICE

CERTIFICATE OF CORRECTION

PATENT NO. : 6,958,820 B1
APPLICATION NO. : 09/685737
DATED : October 25, 2005
INVENTOR(S) : Shumpei Takenaka et al.

It is certified that error appears in the above-identified patent and that said Letters Patent is hereby corrected as shown below:

ON TITLE PAGE ITEM (56) REFERENCES CITED

Foreign Patent Documents
"EP 0 920 186 A2 9/1994" should read --EP 0 920 186 A2 6/1999--.
"WO WO 97/60243 A 12/1997" should read --WO WO 97/50243 A 12/1997--.

Signed and Sealed this

Twenty-seventh Day of May, 2008

JON W. DUDAS
*Director of the United States Patent and Trademark Office*